United States Patent Office 3,385,942
Patented May 28, 1968

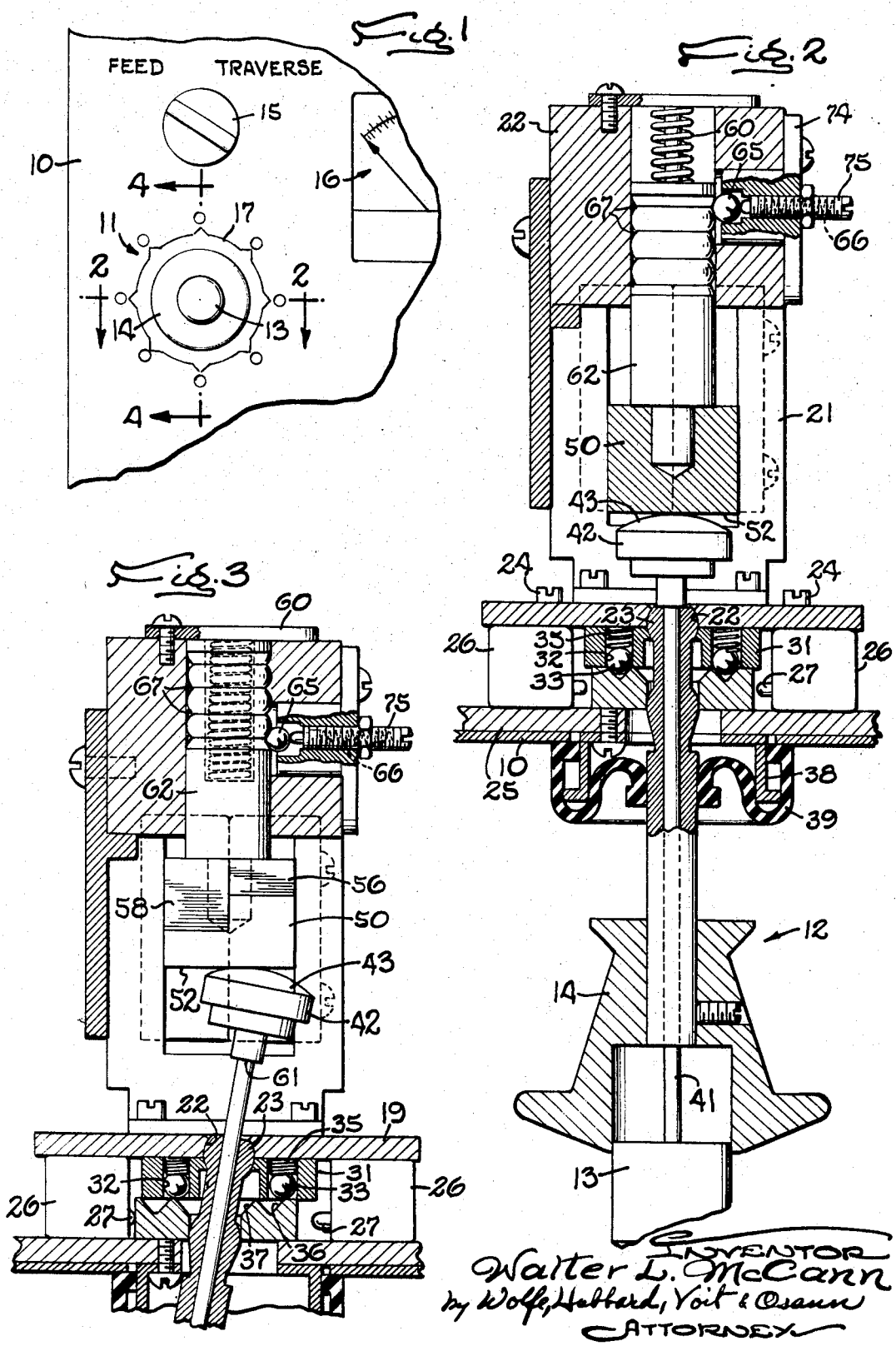

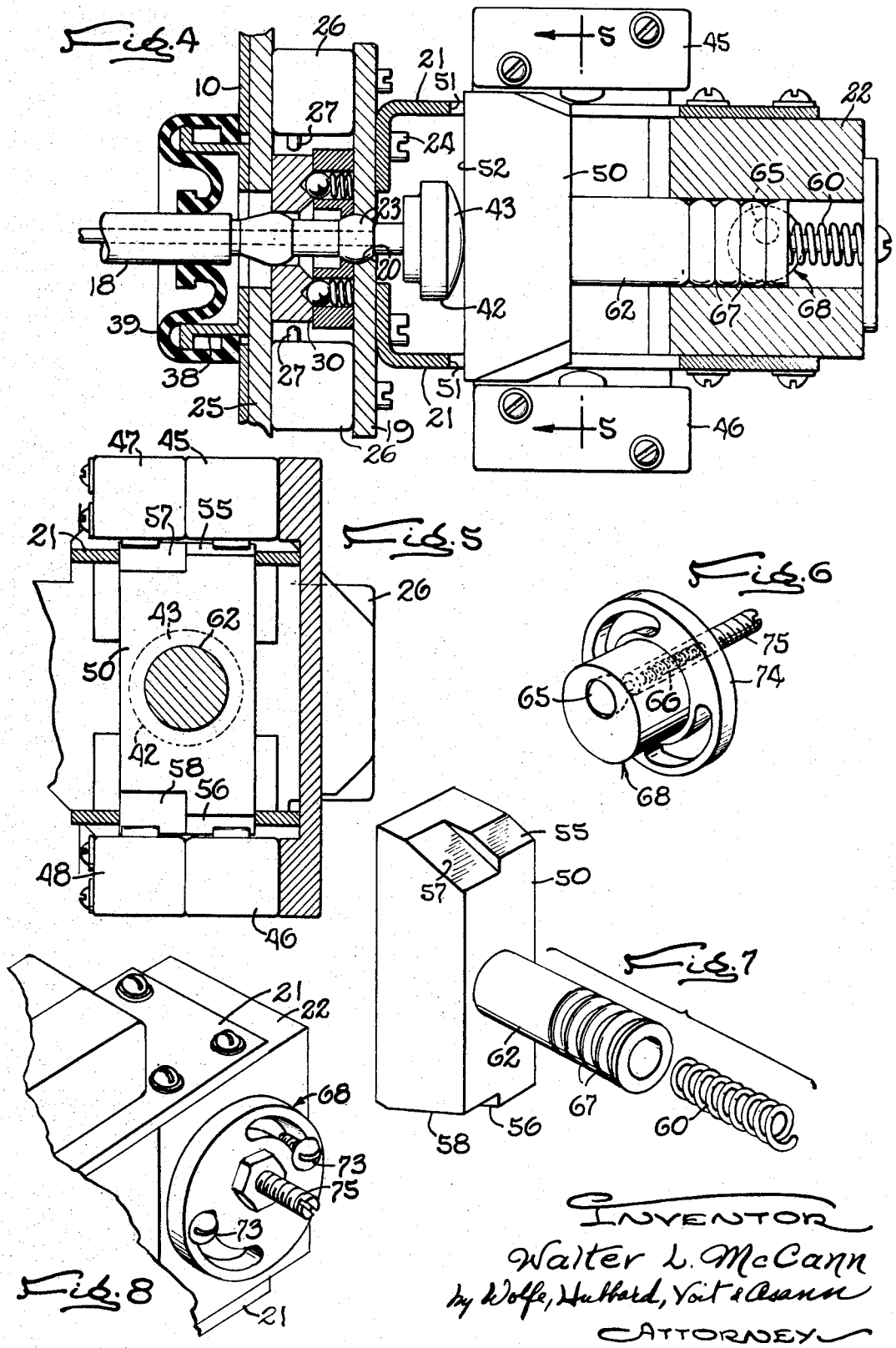

3,385,942
JOYSTICK CONTROL LEVER WITH PUSHBUTTON SPEED CONTROL FOR MACHINE TOOLS
Walter L. McCann, Fond du Lac, Wis., assignor to Giddings & Lewis Inc., a corporation of Wisconsin
Filed Sept. 19, 1966, Ser. No. 580,354
3 Claims. (Cl. 200—153)

ABSTRACT OF THE DISCLOSURE

A hand-operated control switch is described for controlling the direction and speed of traversing machine tool elements. A swivel control handle of the "joystick" type contains a thumb-operated pushbutton which selectively increases the rate of movement as it is progressively depressed.

---

The present invention relates generally to machine tools having one or more translatable elements. More particularly, the invention relates to switch mechanisms for simultaneously controlling both the speed and direction of travel of such machine tool elements by means of a single control.

In machine tools such as the vertical turret lathe described in United States Patent No. 2,831,361, issued Apr. 22, 1958, on the application of John C. Hollis, one or more movable elements may be translated along their ways at a selected one of a large number of feed rates. Such elements are additionally movable at a considerably faster rate or rates which are useful in traversing an element from one cutting position to another.

Machine tools of this character may also include a multiple-function control switch for electrically engaging and disengaging various electromagnetic clutches controlling the movement of the machine tool elements. This control has come to be known in the trade as a "joystick" control because of its resemblance to the familiar control stick of that name which was once commonly used in aircraft. By moving the joystick machine tool control in different directions, corresponding movements may be initiated and controlled in the various machine elements. In the vertical turret lathe disclosed by Hollis, as an example, the elements thereby controlled comprise rams carrying the various tool heads and movable saddles which support the rams. In general, each ram is independently movable with respect to its saddle, while the saddle is also separately movable perpendicular to the direction of ram movement.

The feed rates of the various rams and saddle elements may be selected by the machine operator in any known manner, including the system of electromagnetic clutches and dial controls disclosed by Hollis. In addition, movement in the desired direction may be accomplished through the type of joystick control disclosed by Hollis in which electromagnetic clutches in the ram and saddle drive trains are selectively energized by means of two pairs of control switches arranged on perpendicular axes within the control. The joystick lever may be pushed by the operator into any of eight different positions in which certain of the control switches are selectively actuated in order to accomplish the desired response. If the lever is moved upward, for example, the ram is caused to move upward, and a downward motion of the lever creates the corresponding response. Sideways movement of the lever similarly induces a corresponding sideways movement of the saddle on which the ram is mounted.

In the switch mechanism disclosed by Hollis, an additional feature is provided by which both ram and saddle movements may be simultaneously initiated and controlled by moving the control lever to one of four diagonal positions. With this type of control, the machine operator may with one hand select one of eight different motions and combinations of motions by merely swinging the joystick lever to the desired position. When the lever is returned to its center, or neutral position, the motion of the tool elements is stopped.

In machine tools of this sort, it is useful to provide a rapid traverse function in which the movable elements may be quickly and accurately shifted from one working position to the next. With the Hollis system, this comprises a pushbutton placed at the tip of the joystick control lever where it may be easily actuated by the operator's thumb. The push-button shaft is coaxial with the control lever, and extends through and beyond the ball joint on which the lever is swiveled to contact yet another electrical switch which, when actuated, disengages the normal feed of the machine element and engages instead a rapid traverse function driven from a separate power source. The ram, saddle, or both elements together are thereby rapidly carried from one operating position to the next as long as the operator continues to depress the pushbutton. When released, the rapid traverse function is disengaged by the electromagnetic clutches, and the ram or saddle comes to rest, or again assumes the controlled feed rate which it had before the rapid traverse function was engaged. The operator may use the rapid traverse function just as with the ram and saddle feeds to move the machine elements in any desired direction, or in two directions at once, by merely swinging the joystick lever to the appropriate position.

The foregoing structure, especially that which is described in greater detail in the Hollis patent, U.S. No. 2,831,361, comprises no part of the present invention. While exceedingly useful, it has been found in practice that a machine constructed in the manner outlined above requires considerable skill on the part of the operator in making use of the rapid traverse function. In order to bring a machine tool element quickly into a desired predetermined position, it is necessary to use the rapid traverse to bring the elements to a point approaching the desired position, whereupon it is then necessary to engage one of the six feeds of the machine drive to bring the element to its final position. Alternatively, the final positioning may be done by means of conventional handwheels, which require the operator to leave his position at the machine controls, and also require considerable muscular effort to operate. Great care must be exercised by the operator to avoid overshooting the desired position, because to do so may result in damage should the tool head run into the work piece or impact against another part of the machine. Speed and accuracy in positioning the various elements are thereby sacrificed because of the need to safely and accurately accomplish the final positioning with either the handwheel or the machine feed itself. In this way, much of the versatility and convenience of the joystick control is lost.

Accordingly, it is a primary object of the present invention to provide an improved control system for manually controlling the positioning of the machine tool elements at predetermined points along their paths of travel.

Another object is to provide a machine tool control system embodying selectively variable rates of rapid traverse for the various machine elements, which rates may be selected and controlled by the operator by means of the same control lever used to control the direction of movement. A related object is to provide control of the direction and rate of movement of the rapid traverse function of machine tool elements by means of a single, convenient, hand-held control.

A further object is to provide a machine tool control system of the above description in which the rapid traverse rates may be independently controlled for any individual moving machine element, or combination of moving elements, as selected and controlled by a joystick control lever.

Other objects and advantages of the invention will become apparent upon reading the following detailed description and upon reference to the drawings, in which:

FIGURE 1 is a fragmentary front elevational view of a control panel incorporating a control switch exemplifying the present invention.

FIG. 2 is a longitudinal sectional view of the control switch taken in the plane of the line 2—2 of FIG. 1, illustrating the control lever in the neutral position.

FIG. 3 is a fragmentary sectional view similar to FIG. 2, in which the control lever is shown swung over to one of its eight operating positions.

FIG. 4 is a fragmentary longitudinal sectional view taken in the plane of the line 4—4 of FIG. 1.

FIG. 5 is a fragmentary transverse sectional view taken in the plane of the line 5—5 of FIG. 4.

FIG. 6 is a perspective view of the detent holder of the control switch.

FIG. 7 is an exploded perspective view of the camming block, detented guide shaft and pushbutton return spring of the control switch; and FIG. 8 is a perspective view of the detent holder as installed in the control switch.

While the invention has been shown and is described in some detail with reference to a particular embodiment, there is no intention that it be limited to such detail. On the contrary, it is intended to cover all modifications, alternative constructions and equivalents falling within the spirit and scope of the invention as defined by the appended claims.

Turning to the drawings, there is shown in FIG. 1 a control panel 10 on which is mounted a control switch 11 embodying the construction of the present invention. Presented for the operator's grasp is a control lever 12 having at its tip a protruding push-button 13 positioned in a knob 14 so that the operator may actuate it with his thumb while grasping the knob 14. Also included on the exemplary control panel as shown in FIG. 1 are a function selector switch 15 and a tachometer 16 for indicating the rate of rotation of a particular machine element, such as the table of a turret lathe. Applied to the face of the panel 10 is a quadrant 17 having eight points, each point corresponding to a respective operating position of the control lever 12. The knob 14 is carried on the end of a shaft 18 to comprise the swingable lever 12 which may be shifted by the operator from one position to another in order to effect directional control of the movable machine tool elements.

The direction of movement of the translatable machine tool element, such as the ram and saddle of a vertical turret lathe, is controlled by finger-tip deflection of the swivel lever 12 comprising the shaft 18 and the control knob 14. Deflecting the lever 12 in a desired direction causes the corresponding machine elements to move in a corresponding direction, and by shifting the lever 12 to the proper intermediate position, a combination of two simultaneous traversing movements may be achieved. The tool holder of a vertical turret lathe, to use the same example, may be moved up or down by feed of its ram alone, or may be moved horizontally in or out by feed of the saddle alone. Additionally, it may be moved diagonally up and in, up and out, down and in, or down and out by simultaneous feed of both saddle and ram. Eight directions of feed movement are thus made possible by energizing the motor means for driving the translatable elements in the desired manner. In the machine described in the Hollis patent, mentioned previously, this is accomplished by direction-determining clutches which are energized singly and in different groups of two, with the rate of movement of the elements being determined by the combinations of speed-changing clutches which are thus energized.

In general, swinging the control lever 12 of the switch 11 provides directional control through two pairs of small switches which are actuated singly or in four groups of two in response to deflection of the control lever 12 in one of eight respective directions from a central neutral position. The construction of this selector assembly is such that the lever is firmly yet yieldably held in its central position, or lightly retained in any of the eight directions in which it might be moved, while being returnable to its central position with but a slight tap.

In its construction, the switch 11 comprises a swivel plate 19 having a centrally-located spherical seat 20. The plate 19 is secured by screws to a pair of side plates 21, which are in turn secured to an end block 22 to comprise a frame assembly. The shaft 18 is provided with a spherical tip 23 of corresponding radius which seats against the spherical seat 20 for swivel motion. Secured to the swivel plate 19 by screws 24 is a mounting plate 25 by which the switch 11 may be secured to the panel 10. Four directional switches 26 of the miniature pressure-sensitive type are carried between the swivel plate 19 and the mounting plate 25. The screws 24 pass directly through the plate 19 and the switch bodies are secured in tapped openings in the mounting plate 25. The switches are spaced angularly about the spherical seat 20 with their respective actuators 27 projecting radially inward.

For actuating the four switches 26 singly and in four groups of two, an annular wobble plate 30 is telescoped over the shaft 18 and slidably disposed between the mounting plate 25 and a detenting plate 31. The wobble plate 30 is adapted at its periphery to engage and depress the yieldable actuators 27 when shifted toward them. Movement of the wobble plate in the direction of one of the switches 26 will cause actuation of that switch alone, while oblique movement in an angular direction will cause actuation of two of the switches 26 simultaneously. With this arrangement, therefore, movement of the shaft 18 in eight directions from its central position actuates the four switches 26 singly or in pairs, as desired.

To yieldably retain the wobble plate 30 in its central position and in each of its eight displaced positions, detenting means are provided which cooperate with corresponding detent surfaces on the underside of the wobble plate 30. The detenting plate 31 is provided with four bores 32, each of which contains a ball plunger 33 and a spring 35 for urging the ball 33 into a corresponding annular groove 36 in the wobble plate 30. As is best shown in FIG. 3, shifting of the control lever 12 to one side causes the wobble plate 30 to shift in the same direction, forcing the pair of balls 33 aligned with the axis of movement down against their springs 35. The other pair of balls still remain seated in the groove 36. The wobble plate 30 is releasably retained in the deflected position by reason of a second annular groove 37 concentrically located within the first groove 36 which engages a single ball 33 as shown in FIG. 3. Since only one detent ball 33 is active to retain the wobble plate 30 in its deflected position, only a slight force or tap is necessary on the control knob 14 to cause it and the wobble plate 30 to snap back into the neutral central position.

For protection of the operating mechanism, an upraised flange 38 is provided on the mounting plate 25 which protrudes through the opening in the panel 10 to receive a convoluted rubber boot 39. The boot 39 fits snugly against both the flange 38 and the shaft 18, while allowing the latter to swivel freely for operation of the switch.

As a principal feature of the invention, there is conveniently associated with the direction control mechanism just described a traverse control means by which one of a plurality of rapid traverse rates may be selected. For this purpose, the shaft 18 is provided with a central bore in which a slidable actuating rod 41 is received. At one end, the actuating rod 41 is secured to the pushbutton 13. At the other end, beyond the spherical tip 23 of the shaft 18 and protruding through the swivel plate 19, is a shoe 42 having a slidable spherical face 43. Because it extends beneath the swivel plate 19, the actuating rod 41 and attached shoe 42 may be moved freely relative to the shaft 18 by pressure on the pushbutton 13 without interfering with the actuation of the various switches 26 as the control lever 12 is shifted.

In accordance with the invention, a plurality of traverse rate switches 45, 46, 47, 48 are provided which are progressively actuated by movement of the pushbutton 13 to effect varying rates of rapid traverse of the particular machine tool elements being engaged through the deflection of the wobble plate 30 against the direction switches 26. Variable rates of rapid traverse may be achieved through the use of electrically operated speed-changing clutches in the manner described in the Hollis patent, previously mentioned. For this purpose, provision is made by which the traverse rate switches 45, 46, 47, 48 are operated sequentially in accordance with the degree of depression of the pushbutton 13, with the speed-changing clutches which determine the rate of traverse being controlled thereby.

For achieving sequential operation, a camming block 50 is slidably received within cut-outs 51 in the side plates 21. The camming block 50 is provided with four beveled ramps 55, 56, 57, 58 which engage respective ones of the switches 45, 46, 47, 48 in sequence. Each of the switches controls one or more speed-changing clutches in a manner such that progressive operation of the switch as the camming block 50 is advanced causes the rate of traverse to be speeded up at each step as the pushbutton is depressed.

One face 52 of the camming block 50 is engageable with the spherical surface 43 of the shoe 42. As shown in FIG. 3, the spherical surface 43 on the shoe 42 has the effect of neutralizing a substantial portion of the angular movement of the lever 12 as the various directional switches 26 are actuated by the wobble plate 30. As illustrated in FIG. 3, the actuating rod 41 is fully extended through maximum depression of the pushbutton 13, and it may be seen that the point of contact of the shoe 42 with the camming block 50 is only slightly removed from the central axis. By choosing a radius for the surface 43 which is approximately equal to the average distance of the slidable shoe face 43 from the pivot of the swivel seat 20 during operation of the control, the effect upon the camming block 50 caused by shifting of the lever 12 from side to side can be made negligible.

When the pushbutton 13 is released (FIGS. 2, 4), none of the traverse rate switches are actuated. This results, in the preferred embodiment, in complete disengagement of the rapid traverse function, while allowing the particular translatable element or elements selected by the swivel lever 12 to move with a preselected feed rate. Spring return is provided for the pushbutton 13 by a return spring 60 mounted in the end block 22. The return spring 60 pushes against and is received within a detented shaft 62 which is, in turn, secured to the camming block 50. The camming block 50 is thereby urged away from engagement with the rate switches and the shoe 42, actuating rod 41 and pushbutton 13 are thereby urged outward. This movement is restrained by a shoulder 61 at the base of the shoe 42 which seats against the lower portion of the spherical tip 23 of the shaft 18.

As the pushbutton 13 is depressed, the rapid traverse functions are brought into operation and the rate of traverse becomes selectively greater as the pushbutton 13 is further depressed. Release of the button will slow or stop the traverse and allow the preselected feed rate to take over, if one has been previously engaged. If no direction of movement for the translatable elements has been selected through actuation of the switch toward one of the points of the quadrant 17, however, actuation of the rapid traverse function by depressing the pushbutton 13 will result in no movement of the machine elements.

In accordance with a further aspect of the invention, the switch mechanism for selecting the rapid traverse function is provided with a quality of "feel" by which the operator may determine what degree of traverse speed has been selected without reference to any visual indicator. This tactile indicator allows the operator to easily and accurately position the machine elements as desired by selecting a rapid rate of traverse at first and gradually slowing the traverse as the machine elements near the desired position by gradual release of the pushbutton 13.

The sensation of "feel" given the pushbutton 13 indicates to the operator the position of the camming block 50 and the state of actuation of the corresponding rate switches 45, 46, 47, 48. The desired effect is provided by a detent mechanism consisting of a spring-loaded ball plunger 65 which selectively seats in one of a plurality of detent grooves 67 in the detenting shaft 62. To allow the "feel" of the mechanism to be varied to suit the operator, the ball plunger 65 and its associated spring 66 are carried in a rotatable detent holder 68 which is received within a corresponding bore in the end block 22. The degree of deflection given the ball plunger 65 is varied by causing the plunger to make contact with the grooved detenting shaft 62 at varying points as determined by the detent holder 68. For this purpose, the plunger 65 and its associated spring 66 are located off-center from the central axis of the holder 68 so that rotation of the plate brings the plunger 65 into contact with the detent grooves 67 at points which are selectively more or less tangent to the detenting shaft 62. The detent holder 68 is secured to the frame 20 by screws 73 extending through a slotted flange 74, which slots are provided to allow the adjustment plate to be rotated to bring the off-center ball plunger 65 into contact with the detenting shaft 62 at different positions.

Further adjustment of the detent and degree of "feel" is provided by a screw 75 and lock nut 76 which may be used to adjust the pressure exerted on the ball 65 by the spring 66.

I claim as my invention.

1. In a machine tool having translatable elements which are movable by electrically-controlled motor means at a plurality of normal and rapid traverse rates, a control switch comprising, in combination, a switch frame, a control lever swivelably carried by said frame, a plurality of switch pairs carried by said frame, said switch pairs being selectively actuated by swiveling said control lever and electrically connected to said motor means for effecting the translation of said movable elements, a resiliently supported pushbutton carried by said control lever, a plurality of interconnected traverse rates switches carried by said frame, a camming block slidable relative to said frame in sequential operating relationship to said traverse rate switches, and an actuating rod carried by said control lever and interconnecting said pushbutton and said camming block, said actuating rod having a slidable face engageable with said camming block to allow swiveling of said control lever.

2. A control switch according to claim 1 in which said frame and camming block include a spring-loaded plunger engageable with a plurality of detents along the path of camming block movement, said detents corresponding to selective ones of said rapid traverse rates.

3. A control switch according to claim 2 in which said frame includes a rotatable detent holder carried by said frame in cooperation with said detents, said spring-loaded plunger being carried off-center from the rotational axis of said detent holder, and locking means for selectively securing said detent holder to said frame in a desired rotational position.

References Cited

UNITED STATES PATENTS 2,391,881  1/1946  Clay _____ 200—153.19
2,831,361  4/1958  Hollis _____ 200—6 XR
2,991,343  7/1962  Norden _____ 200—153.12

FOREIGN PATENTS 202,815  8/1923  Great Britain.

ROBERT K. SCHAEFER, *Primary Examiner.*

H. BURKS, *Assistant Examiner.*